Patented Jan. 3, 1939

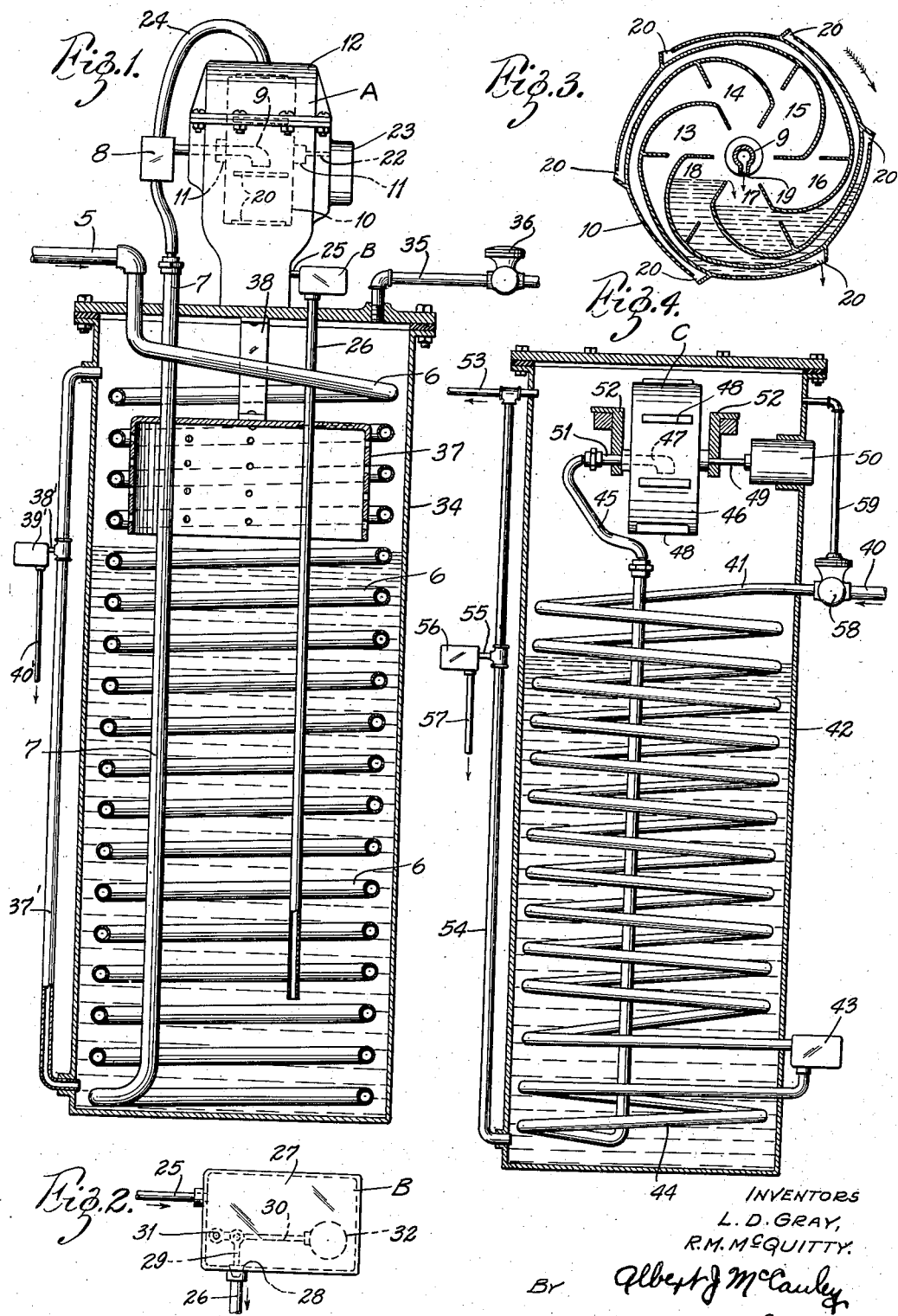

2,142,392

UNITED STATES PATENT OFFICE 2,142,392

APPARATUS FOR METERING VAPORS

Leven D. Gray, Richmond Heights, and Roy M. McQuitty, Maplewood, Mo.

Application October 21, 1935, Serial No. 45,996

10 Claims. (Cl. 73—198)

This invention relates to apparatus for metering vapors, and more specifically to apparatus for metering in liquid phase fluids during their passage, while substantially entirely in vapor phase, from a source of supply to a point of consumption.

In numerous localities steam is generated at central heating plants and distributed to various consumers within the vicinity of the heating plants. While these systems have many advantages, it has heretofore been very difficult, if not impossible, to accurately determine the amount of steam supplied to a consumer under some conditions.

The ordinary orifice meters for measuring the flow of fluid in a gaseous state are unsatisfactory when the rate of flow is small relative to the capacity of the meter, or when there are variations in pressure conditions or quality of the vapor. Therefore, to determine the quantity of steam supplied to a consumer, it has been the practice to measure the condensate of the steam after it has performed its useful function. Under many conditions, it is both difficult and expensive to collect the condensate for metering purposes, and in some cases where the steam is permitted to escape into the atmosphere it is practically impossible to provide for the transmission of the condensate to a meter.

Where it has been extremely difficult or impossible to obtain the condensate to provide for a metering of the same, it has been the practice to estimate the quantity of steam supplied to the consumer. Obviously, such a procedure is frequently unfair either to the consumer or to the distributing company.

An object of this invention, therefore, is to provide a simple and effective apparatus for metering a vapor such as steam while it is flowing from a source of supply to a point of consumption.

Another object of this invention is to provide a very efficient apparatus of this type wherein the loss of heat in the metered vapor is reduced to a minimum.

A further object of this invention is to provide a system of metering vapors wherein the accuracy is not affected by the rate of flow, variations in pressure conditions or quality of the vapor.

A still further object of this invention is to eliminate the necessity of collecting the condensate at the point of consumption for metering purposes.

With the foregoing and other objects in view, the invention comprises the novel construction, combination and arrangement of parts hereinafter more specifically described and shown in the accompanying drawing, which illustrates the invention. However, it is to be understood that the invention comprehends changes, variations and modifications which come within the scope of the claims hereunto appended.

Fig. 1 is a vertical section, partly in elevation, illustrating a metering system embodying features of this invention.

Fig. 2 is a diagrammatical view of a stream trap adapted for use in the system.

Fig. 3 is a vertical section of a rotary drum forming part of a condensate meter.

Fig. 4 is a view similar to Fig. 1, showing another form of the invention.

As a specific illustration of the invention, we have shown in Fig. 1 a system for metering vapors, such as steam. The steam to be metered may be generated at any suitable source of supply (not shown) and enters the system under pressure through a conductor 5 leading to a condensing element or coil 6. In passing through the coil 6 the heat of vaporization is removed from the steam to condense the same. The resultant condensate collects at the bottom of coil 6 and is forced by the pressure of the incoming steam through a conductor 7 to a separating chamber 8 from which the condensate is transmitted through a spout 9 to a meter A where the condensate is measured.

Since any suitable condensate meter may be employed, we have omitted many of the usual structural details of the meter A. The meter A, as shown in Figs. 1 and 3, may comprise a cylindrical rotatable drum 10 supported on bearings 11 in a housing 12. The drum 10 may be divided into compartments 13, 14, 15, 16, 17 and 18, as illustrated in Fig. 3. Condensate enters the drum 10 by means of the spout 9 which is located axially at the center of the drum. In the bottom of the spout 9 is a slot 19 through which condensate passes to the compartment having an opening immediately below the spout 9. Each of the compartments 13 to 18 is provided with an outlet 20 to provide for the discharge of condensate.

Due to the arrangement and shape of each of the compartments 13 to 18, the center of gravity constantly moves towards one side of the drum, as the condensate fills a compartment. This shifting center of gravity causes the drum to rotate.

During each revolution of the drum, each of the compartments 13 to 18 fills and discharges a definite and fixed volume of condensate through its outlet 20. Fig. 3 illustrates successive stages in the filling and emptying of the compartments during the rotation of the drum 10. Compartment 13 is nearly empty and is discharging liquid through its outlet 20, and compartment 18 which has been filled is overflowing into compartment 17, which is receiving condensate from the spout 9.

Motion from the drum 10 is transmitted through a shaft 22 to a counter 23 which registers the quantity of condensate passing through the drum 10. We do not deem it necessary to show the details of this counter, as it may be similar to the usual type ordinarily employed in condensate meters.

The condensate in meter A is preferably subjected to a pressure sufficient to maintain the condensate in a liquid condition. We have shown a conductor 24 extending from the separating chamber 8 to the housing 12 of the meter A, whereby the pressure of any uncondensed steam in the separator 8 is transmitted to the interior of the housing 12.

The condensate flowing from the drum 10 is discharged into the bottom of the meter housing 12 from which it passes through an overflow pipe 25 to a steam trap B and thence to a discharge conductor 26.

The steam trap B may be any suitable device which will permit the desired flow of condensate while preventing a discharge of steam through the conductor 26. As diagrammatically illustrated in Fig. 2, the steam trap B may include a housing 27 and a float valve structure comprising a valve member 28 secured by an arm 29 to an operating lever 30. One end of the lever 30 is pivotally mounted at 31 and the other end of the lever is provided with a float 32.

Condensate enters the housing 27 through the pipe 25 and when sufficient condensate is present in the housing to move the float 32 upwardly from the position shown in Fig. 2, motion is transmitted through the lever 30 and arm 29 to the valve member 28 to move the valve member from its seat, thereby permitting a discharge of condensate through the conductor 26. Whenever the quantity of condensate in the housing 27 decreases to such an extent that the float 32 occupies the position shown in Fig. 2, the valve member 28 is in its closed position to prevent a discharge of the condensate from the trap. The float 32, as illustrated in Fig. 2, closes the valve member 28 before all of the condensate is discharged from the housing 27.

The condensate flowing through conductor 26 from the steam trap B is discharged into a closed container 34 in which the coil 6 for condensing the incoming steam is located. The condensate in container 34 receives the heat of vaporization given up by the steam in the coil 6, and is converted into secondary steam. The secondary steam above the level of the condensate in container 34 will receive heat from the exposed portion of the coil 6 to further heat the secondary steam.

The container 34 is provided with an outlet conductor 35 through which the secondary steam may be transmitted to a point of consumption. To provide for the delivery of steam under a substantially constant pressure, the conductor 35 may be provided with a pressure regulating valve 36.

A baffle 37 may be secured in the container 34 by a support 38 to remove particles of water carried by the rising secondary steam.

During the normal operation of the metering device heretofore described, the metered condensate discharged into the container 34 will be vaporized. However, when a very small quantity of steam is being withdrawn from the container 34 through the outlet conductor 35, an excess of condensate may tend to accumulate in the container 34. To prevent an accumulation of condensate above the liquid level illustrated in Fig. 1, a conductor 37' extending from the upper portion of the container 34 to the lower portion thereof may be provided with an overflow pipe 38' whereby excess condensate is transmitted through a steam trap 39' to a discharge conductor 40'. The steam trap 39' may be similar in structure and operation to the trap B.

As a specific illustration of one manner of carrying out our invention, we will give a specific example of the operation of the system shown in Fig. 1.

Steam at a temperature of about 366° F. and having approximately 1195 British thermal units for each pound of steam may be delivered under a gage pressure of 150 pounds to the square inch through the conductor 5 to the coil 6. The heat of vaporization is removed from the steam in coil 6 by a heat transfer to the condensate in container 34. The resultant condensate collects at the bottom of the coil 6. This condensate is at a temperature of approximately 366° F., as the heat of vaporization is merely removed from the steam.

Thermal losses through the housing 12 of the meter A cause a slight drop in pressure in the housing 12 and the incoming steam will force the condensate through the conductor 7 and spout 9 into the drum 10. The pressure on the condensate in the meter A is preferably just sufficient to maintain the condensate in a liquid condition. The condensate, after actuating the drum 10 and counter 23 to measure the condensate, collects at the bottom of the housing 12. The metered condensate then flows through pipe 25 to steam trap B. The introduction of condensate into the steam trap B causes the valve 28 to open for a discharge of the condensate through conductor 26 into the container 34. The condensate and steam in container 34 may be under a gage pressure of about 100 pounds to the square inch. Since the gage pressure in the container is less than in the trap the condensate enters the container without the use of a pump, or the like.

Due to the reduction in pressure on the condensate and the heat transfer from the coil 6, the condensate discharge into the container 34 is converted into steam. This secondary steam may then be transmitted through conductor 35 to the point of consumption.

The steam leaving the system will be at a temperature of about 345° F., and has approximately 1193 British thermal units to a pound of steam. Since the incoming steam contains 1195 British thermal units to a pound of steam, it is evident that the herein described system of metering vapors is extremely efficient as the heat loss is only about 2 British thermal units to the pound of steam.

As a further illustration of our invention, we have shown another form thereof in Fig. 4.

In this form of the invention the steam to be metered enters the system under pressure through a conductor 40 leading to a coil 41 located in a closed container 42. The heat of vaporization is removed from the steam in coil 41 and the resultant condensate is transmitted from the coil 41 through a steam trap 43 to a cooling coil 44. Any steam formed in the coil 44 after leaving the steam trap 43 will be condensed in passing through the coil 44.

The condensate in coil 44 is transmitted through a conductor 45 to a condensate meter C for measuring the condensate. The meter C may include a rotatable drum 46 similar in structure to the drum 10, as shown in Figs. 1 and 3. The condensate enters the drum 46 through a spout 47 and is discharged therefrom through the outlets 48.

Motion is transmitted from the drum 46 through a shaft 49 to a counter, or indicator, 50, which registers the quantity of condensate passing through the drum 46. The counter, which may be of the usual type ordinarily employed in condensate meters, is located in a side wall of the container 42, as illustrated in Fig. 4. The shaft 49 and the extended portion 51 of the spout 47 may be held in position by supports 52.

The condensate discharged from the drum 46 collects in the container 42 where it receives the heat given up by the steam and condensate in coils 41 and 44. This heat transfer converts the metered condensate into secondary steam which is then discharged from the container 42 through a conductor 53.

To prevent an accumulation of condensate in the container 42 above the liquid level illustrated in Fig. 4, a conductor 54, extending from lower portion of the container 42 to the outlet conductor 53, is provided with an overflow pipe 55 leading to a steam trap 56 from which excess condensate may be discharged from the system through a conductor 57.

In the system shown in Fig. 4 where the drum 46 and spout 47 of the meter C are located in the container 42, the interior of the container is preferably under a pressure just sufficient to maintain the condensate flowing from the spout 47 in a liquid condition until it is discharged from the drum 46. However, a higher pressure may be employed if desired. To provide for a maintenance of the desired pressure in the container 42, the conductor 40 for the incoming steam may be provided with a pressure regulating valve 58 having a pilot line 59 extending therefrom to the interior of the container 42. The pressure in the container 42 will, therefore, be transmitted through line 59 to the valve 58 where it may be employed to operate the valve 58 in accordance with the pressure in the container 42. In other words, the valve 58 is actuated by the pressure in the container 42 to increase or decrease the flow of incoming steam until the desired pressure is obtained in the container 42. Since the valve 58 may be any suitable pressure regulating valve, we have not shown the details of its structure. It will be understood that the drop in pressure on the condensate in coil 44 and container 42 is caused by a discharge of steam through the outlet pipe 53.

The operation of the metering device shown in Fig. 4 may be briefly summarized as follows.

Steam from a source of supply is transmitted through the conductor 40 to the coil 41. The quantity of steam entering the coil 41 is regulated by the valve 58 so as to maintain the desired pressure in the container 42. The heat of vaporization is removed from the steam in the coil 41, and the resultant condensate is transmitted through steam trap 43 to the coil 44. The coil 44 will condense any steam that may be formed therein upon leaving the steam trap 43.

The cooled condensate its transmitted from the coil 44 through conductor 45 and spout 47 to the drum 46 by the pressure of the condensate entering the coil 44 from the steam trap 43. The condensate after being measured in drum 46 drains into the body of condensate in the lower portion of the container 42.

This metered condensate receives the heat given up by the steam and condensate in coils 41 and 44 to convert the metered condensate into steam. This steam may then be discharged from the container 42 through the conductor 53, and thereafter employed to perform its useful function.

It will be observed that the herein described systems will very effectively measure vapors, such as steam, while passing from a source of supply to a point of consumption, thereby eliminating the necessity of collecting the condensate at the point of consumption for metering purposes.

Moreover, our systems for metering vapors are highly efficient, as the loss of heat in the metered vapors is reduced to a minimum, and the condensing and vaporizing operations may be carried out by an effective heat exchange without employing extraneous cooling and heating mediums.

To illustrate our invention, we have shown numerous details of construction which may be readily modified by those skilled in the art, without in any way departing from the spirit of the invention as set forth by the claims.

We claim:

1. In an apparatus for metering steam, a condensing element wherein the steam to be metered is condensed, a cooler for lowering the temperature of the resultant condensate, a steam trap located between said condensing element and said cooler to prevent the escape of steam from the condensing element to the cooler, a device for metering said condensate, and a container for receiving the metered condensate from the metering device, said condensing element being in heat transferring relationship to said container to provide for the transmission of heat from the condensing element to the metered condensate to convert the metered condensate into steam, and said container being provided with an outlet for the last mentioned steam.

2. In an apparatus for metering steam, a condensing element wherein the steam to be metered is condensed, a cooler for lowering the temperature of the resultant condensate, a steam trap located between said condensing element and said cooler to prevent the escape of steam from the condensing element to the cooler, means for metering said condensate, and a container adapted to receive the metered condensate, said container being provided with a steam trap to permit the discharge of excess liquid, said condensing element being located in said container to provide for the transmission of heat from the condensing element to the metered condensate to convert the metered condensate into steam, and said container being provided with an outlet for the last mentioned steam above the elevation of the last mentioned steam trap.

3. In an apparatus for metering steam, a condensing element whereby the steam to be metered is condensed, a device for metering the resultant condensate, a container for receiving the metered condensate from the metering device, said container being provided with a steam trap for the discharge of excess liquid, said condensing element being located in said container to provide for the transmission of heat from the condensing element to the metered condensate to convert the metered condensate into steam, and said container being provided with an outlet for the last mentioned steam above the elevation of said steam trap.

4. In an apparatus for metering steam, a condensing element wherein the steam to be metered is condensed, a device for metering the condensate passing from said condensing element, a container for receiving the metered condensate from the metering device, said condensing element being in heat transferring relationship to said container to provide for the transmission of heat from the condensing element to the metered condensate to convert the condensate into secondary steam, and a steam trap for preventing the transmission of the first mentioned steam, while in a vapor form, to said container, said container being provided with an outlet for the secondary steam.

5. In an apparatus for metering steam, a condensing element whereby the steam to be metered is condensed, a device for metering the resultant condensate, a steam trap permitting the discharge of liquid from the metering device while preventing the discharge of steam, and means, disposed in heat-transferring relationship to said condensing element, for receiving the metered condensate from the metering device for the transmission of heat from the condensing element to the metered condensate to convert the metered condensate into steam, and an outlet for the last-mentioned steam.

6. In an apparatus for metering steam, a condensing element whereby the steam to be metered is condensed, a device for metering the condensate passing from said condensing element, a steam trap permitting the discharge of liquid from the metering device while preventing the discharge of steam, and a container to receive the metered condensate from the metering device, said container being provided with a steam trap for the discharge of excess liquid, and said condensing element being located in said container to provide for the transmission of heat from the condensing element to the metered condensate to convert the metered condensate into steam.

7. In an apparatus for metering steam, the combination of a liquid-meter actuated by the weight of the liquid and provided with an inlet, a conduit for incoming unmetered steam, an element connected between said inlet and said conduit within which is absorbed substantially only the heat of vaporization of the incoming steam thereby to convert it to liquid-condensate, a container receiving said liquid-condensate after passage by gravity through said meter, means including means within said container responsive to change in the level of the liquid therein for discharging said liquid-condensate at reduced pressure into heat-exchanging relation with said incoming steam in said element to convert said metered condensate into steam by absorbing said heat of vaporization of said incoming steam, and a conduit for said metered steam.

8. In an apparatus for metering steam under super-atmospheric pressure, the combination of a meter for the measurement of liquid, a conduit for incoming unmetered steam, an element connected between said conduit and said meter within which is absorbed substantially only the heat of vaporization of the incoming steam to form liquid-condensate for passage through said meter, means including a conduit for conducting the metered condensate at reduced pressure into heat-exchanging relation with said incoming steam in said element to convert said metered condensate into steam at super-atmospheric pressure, a float-operated valve responsive to change in level of metered condensate for discharging into said second-named conduit metered condensate at reduced pressure, and means for maintaining within said meter and upon the liquid-condensate passing therethrough a vapor pressure sufficient to maintain said condensate in a liquid condition.

9. In an apparatus for metering steam under pressure, the combination of a meter for the measurement of liquid, a conduit for incoming and unmetered steam, an element forming a connection between said meter and said conduit within which is absorbed substantially only the heat of vaporization of the incoming steam thereby to form liquid condensate for passage through said meter, a container receiving said liquid condensate after metering thereof, means including means responsive to change in the liquid level within said container for discharging said liquid condensate at reduced pressure into heat-exchanging relation with said incoming steam in said element to convert said metered condensate into steam by absorbing the said heat of vaporization of said incoming steam, and a conduit for said metered steam.

10. In an apparatus for metering steam, the combination of means for transmitting steam under super-atmospheric pressure from a source of supply to a point of consumption, means disposed in a zone between said source and said point of consumption and through which said steam passes in heat-exchange relation with steam condensate for absorption of the heat of vaporization from said steam simultaneously to vaporize said condensate and to condense said steam to liquid condensate of a temperature substantially the same as that of said incoming steam, means in a second zone, between the inlet and outlet of which the pressure drop is substantially nil, for metering said liquid condensate, said metering means including a chamber for receiving said metered condensate, means responsive to change in the level of the liquid condensate within said chamber for discharging said metered condensate at reduced pressure to said heat-exchanging zone wherein said metered condensate by said absorption of substantially only said heat of vaporization of said incoming steam is converted into metered steam.

LEVEN D. GRAY.
ROY M. McQUITTY.